United States Patent
Hsieh

(10) Patent No.: US 8,358,274 B2
(45) Date of Patent: Jan. 22, 2013

(54) CONTROL METHOD FOR GENERATING VARYING COLORED LIGHTS IN KEYBOARD AND SELF-LUMINOUS KEYBOARD FOR REALIZING THE SAME METHOD

(75) Inventor: Yu-Chun Hsieh, Taipei Hsien (TW)

(73) Assignee: Zippy Technology Corp., Hsin-Tien, Taipei Hsien (TW)

( * ) Notice: Subject to any disclaimer, the term of this patent is extended or adjusted under 35 U.S.C. 154(b) by 877 days.

(21) Appl. No.: 12/409,019

(22) Filed: Mar. 23, 2009

(65) Prior Publication Data

US 2010/0238120 A1   Sep. 23, 2010

(51) Int. Cl.
*G06F 3/02* (2006.01)
(52) U.S. Cl. ........................................................ 345/170
(58) Field of Classification Search .................... 434/228
See application file for complete search history.

(56) References Cited

U.S. PATENT DOCUMENTS

| | | | | |
|---|---|---|---|---|
| 6,862,017 | B2 * | 3/2005 | Chen | 345/168 |
| 7,333,031 | B1 * | 2/2008 | Bantner | 341/22 |
| 2005/0073446 | A1 * | 4/2005 | Lazaridis et al. | 341/22 |
| 2010/0302162 | A1 * | 12/2010 | Jo | 345/168 |

FOREIGN PATENT DOCUMENTS

| | | | |
|---|---|---|---|
| JP | 09090317 A | * | 4/1997 |
| TW | 509955 | | 11/2002 |
| TW | M256532 | | 2/2005 |
| TW | M330513 | | 4/2008 |
| WO | WO 2008097039 A1 | * | 8/2008 |

\* cited by examiner

*Primary Examiner* — Hoa T Nguyen
*Assistant Examiner* — Mark Fischer
(74) *Attorney, Agent, or Firm* — Muncy, Geissler, Olds & Lowe, PLLC

(57) ABSTRACT

The present invention discloses a control method for generating varying colored lights in a keyboard and a self-luminous keyboard for realizing the same method. The control method comprises steps: establishing a driving signal table storing a plurality of backlight driving signals; setting the conditions for outputting the backlight driving signals respectively; detecting a keying signal generated by pressing a key; outputting the backlight driving signal corresponding to the keying signal to drive a backlight unit, or sequentially outputting the backlight driving signals according to the keying signal to drive a backlight unit. The self-luminous keyboard for realizing the same method comprises a memory unit storing the driving signal table and a microcontroller unit detecting the keying signals. The microcontroller unit sequentially outputs the backlight driving signals to drive the backlight unit, or outputs the backlight driving signal corresponding to the keying signal to drive the backlight unit.

16 Claims, 7 Drawing Sheets

CONTROL METHOD FOR GENERATING VARYING COLORED LIGHTS IN KEYBOARD AND SELF-LUMINOUS KEYBOARD FOR REALIZING THE SAME METHOD

FIELD OF THE INVENTION

The present invention relates to a control method for generating varying colored lights in a keyboard and a self-luminous keyboard for realizing the same method, wherein the keying signal is detected and used to drive the backlight device to provide a corresponding colored light.

BACKGROUND OF THE INVENTION

In the early stage of computer development, the keyboard had been a fundamental input device. Although the computer has progressed tremendously, the keyboard is still not far away from the prototype until now. However, some manufacturers had developed self-luminous keyboards to convenience using the keyboard in a dim environment or provide a gorgeous and colorful effect. Now, the self-luminous keyboards are familiar to people and available in the market. Generally, LED is used as the light source in the very limited space of a keyboard. A R.O.C. patent No. 509955 disclosed a "Self-Luminous Keyboard", which is a basic type self-luminous keyboard and has a keyboard unit and a backlight device. The backlight device is arranged below the keyboard unit and projects light upward to the keyboard unit. The light may be generated by LED or an electroluminescent sheet. A R.O.C. patent of License No. M330513 disclosed a "Light-Emitting Structure for Keyboard", wherein side light sources are installed inside the keyboard in addition to the light-emitting elements arranged below the keys, and wherein a light-guide plate is used to make light emitted uniformly from below the keys. The prior-art patent has a key unit, at least one light-emitting element, and several light-guide plates. The light-guide plates are arranged on the same plane and below the key unit. The light-emitting element is arranged on the light-incident faces of the light-guide plates. A reflector, or the like, is arranged underneath the light-guide plates to reflect the light emitted by the light-emitting element to the key unit. Many other prior-art patents of self-luminous keyboards also have the backlight function and provide uniform illumination. All the self-luminous keyboards convenience using the keyboard in a dim environment and/or provide a gorgeous and colorful effect.

A R.O.C. patent of License No. M256532 disclosed a "Multi-Color Self-Luminous Keyboard", which can provide multiple colors of light for different areas of the keyboard, wherein a multi-color electroluminescent sheet having several light-emitting areas is arranged below the keys. The light-emitting areas respectively provide different colors of light for different key groups, such as the functional key group, the numeric key group and the directional key group. However, the key areas illuminated by the colored lights and the colored lights illuminating the key areas are predetermined in fabrication. Thus, the users cannot define the key areas illuminated by the colored lights and the colored lights illuminating the key areas by themselves.

There have been various types of self-luminous keyboards. However, the light variations of the keyboards are predetermined by the manufacturers and very dull. Therefore, the self-luminous keyboard still has room to improve.

SUMMARY OF THE INVENTION

As the lighting colors of the conventional self-luminous keyboard is too dull or cannot be adjusted by the user himself, one objective of the present invention is to provide a method and structure for controlling the backlight unit of a keyboard, whereby the keyboard may have varying colors of the backlight.

The present invention proposes a control method for generating varying colored lights in a keyboard and a self-luminous keyboard for realizing the same method. The control method has at least two embodiments. One embodiment of the control method comprises steps: establishing a driving signal table storing a plurality of backlight driving signals; setting the conditions for outputting the backlight driving signals respectively, wherein each backlight driving signal is corresponding to at least one keying signal; detecting a keying signal generated by pressing a key and then determining to output the backlight driving signal to drive a backlight unit. In other words, the control method establishes a driving signal table containing a plurality of backlight driving signals and detects the keying signal to output a corresponding backlight driving signal, whereby the backlight unit of the operated keyboard emits light of a corresponding color.

Another embodiment of the control method comprises steps: establishing a driving signal table storing a plurality of backlight driving signals; setting detecting the generation of a keying signal as the condition for outputting a backlight driving signal; detecting a keying signal generated by pressing a key and sequentially outputting the backlight driving signals according to the keying signal. This embodiment is different from the preceding embodiment in that a keying signal triggers the sequential output of the backlight driving signals, which have been established in the driving signal table beforehand. In other words, the shift of the backlight driving signals is according to the driving signal table programmed beforehand in this embodiment. Thus, the variation of the colored lights of the keyboard is enabled by either the sequential output of the backlight driving signals or the user's pressing the keys.

The self-luminous keyboard for realizing the abovementioned control method comprises a casing, a circuit board arranged inside the casing, a key unit pressed by a user to trigger the circuit board to generate a keying signal, and a backlight unit arranged below the key unit. The backlight unit contains several light-emitting element groups respectively emitting different colors of lights. The self-luminous keyboard further comprises a memory unit storing a driving signal table and a microcontroller unit obtaining the keying signals. The driving signal table contains a plurality of backlight driving signals determining the brightness of the light-emitting element groups. The self-luminous keyboard can realize the two embodiments of the control method mentioned above. When the user presses keys, the microcontroller determines the brightness of each light-emitting element group of the backlight unit according to the keying signals and the driving signal table. Thus, the backlight unit provides the lights of different colors corresponding to different keys. Alternatively, the microcontroller unit detects the generation of a keying signal and then sequentially reads the backlight driving signals from the memory unit and then sequentially outputs the backlight driving signals to the backlight unit. The backlight unit presents the sequential shift of the colored lights. Further, the user can use software to write a new driving signal table to the memory unit and renew the relationship between the keys and the colors of lights.

In summary, the present invention is characterized in that the self-luminous keyboard has variable backlight colors.

DETAILED DESCRIPTION OF THE PREFERRED EMBODIMENTS

Figure 1:
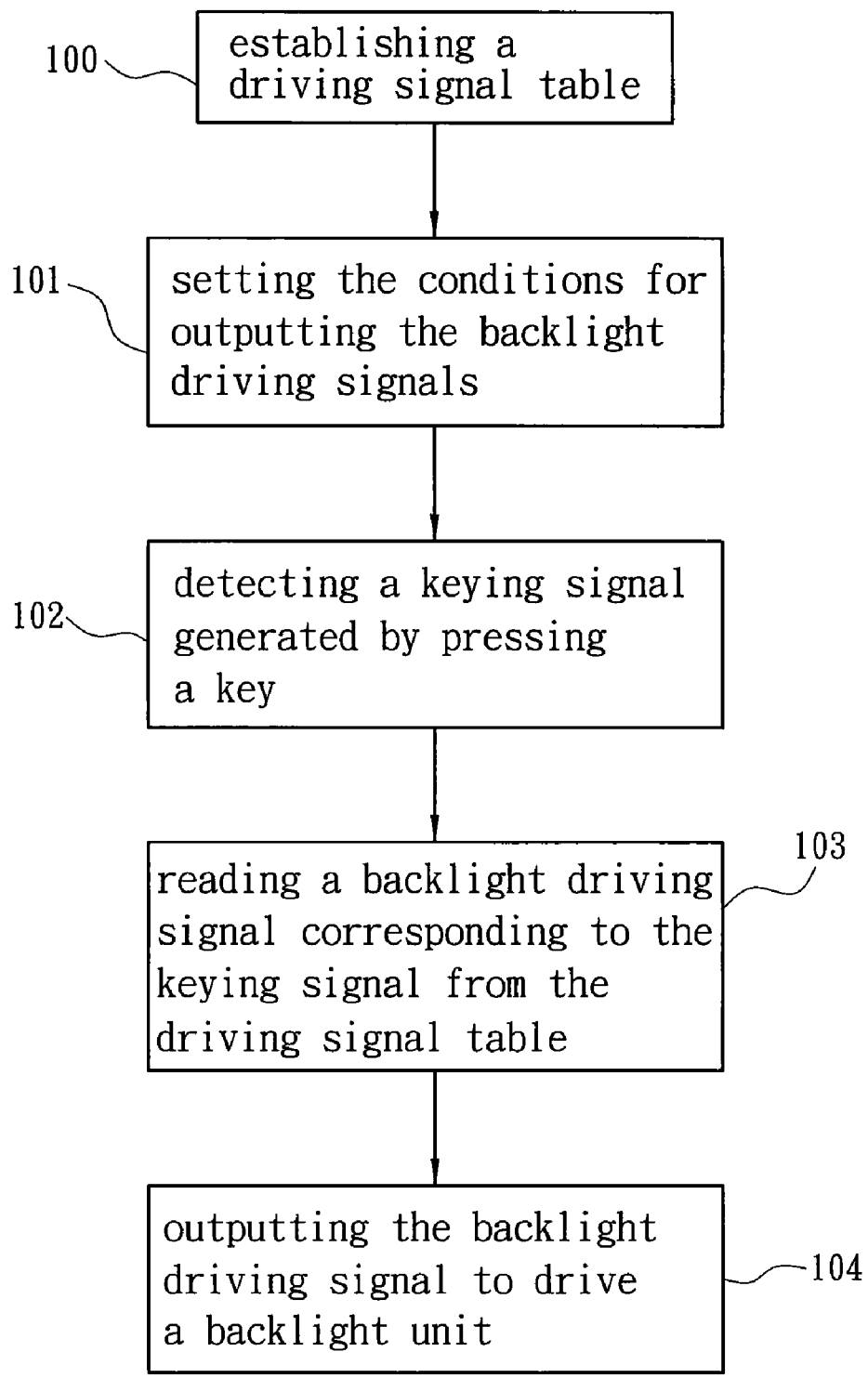
FIG. 1 is a flowchart of a first embodiment of the control method according to the present invention.
Figure 3:
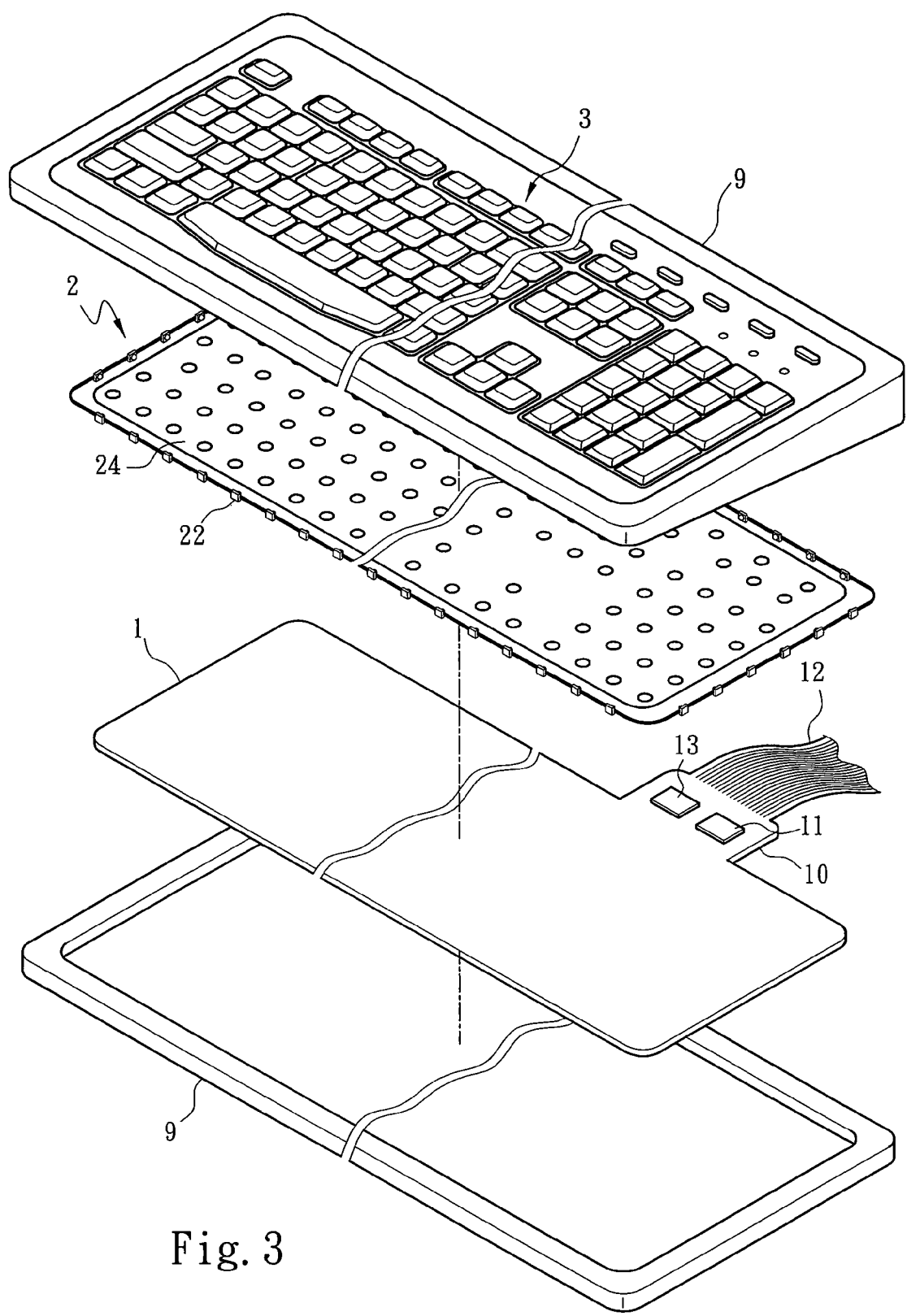
FIG. 3 is an exploded view schematically showing the structure of a self-luminous keyboard for realizing the control method according to the present invention.

The present invention discloses a control method for generating varying colored lights in a keyboard and a self-luminous keyboard for realizing the same method. The control method has two embodiments and is used to control a self-luminous keyboard. The self-luminous keyboard comprises a key unit containing keys a user presses to generate keying signals, a backlight unit containing at least one light-emitting element group, and a microcontroller unit, as shown in FIG. 3. Refer to FIG. 1 for a first embodiment of the control method according to the present invention. The first embodiment of the control method comprises steps: establishing a driving signal table containing a plurality of backlight driving signals (Step 100 in FIG. 1); setting the conditions for outputting the backlight driving signals respectively (Step 101 in FIG. 1); detecting a keying signal generated by pressing a key (Step 102 in FIG. 1); reading the backlight driving signal corresponding to the keying signal from the driving signal table (Step 103 in FIG. 1); and outputting the backlight driving signal to drive a backlight unit (Step 104 in FIG. 1). The driving signal table contains a plurality of backlight driving signals used to control the brightness of at least one light-emitting element group. The output condition of the backlight driving signals defines the relationship of each backlight driving signal and at least one keying signal. The keying signal is detected and used as the condition to determine which backlight driving signal is to be output. In other words, one or more keying signals are set to be corresponding to one backlight driving signal of the driving signal table. In the first embodiment of the control method, a plurality of keying signals may be set to be the condition to output a given backlight driving signal. In other words, pressing several different keys may output an identical backlight driving signal. For example, the keys of characters from A to E may be predetermined to be corresponding to a first backlight driving signal; the keys of characters from F to K may be predetermined to be corresponding to a second backlight driving signal. The first backlight driving signal and the second backlight driving signal respectively drive the backlight unit to generate lights of different brightnesses, lights of different colors, or lights of different combinations of brightnesses and colors. In the first embodiment of the control method, a plurality of keys of the keyboard may be categorized into several key groups, and the keys of the same key group are all corresponding to the same backlight driving signal. For example, all the numeric keys are allocated into one group, and all the directional keys are allocated into another group; pressing the keys of different groups will generate different backlight driving signals. Alternatively, each backlight driving signal may be set to be corresponding to a unique key, and pressing one key will generate a unique color of light; thus, pressing the keys will generate lights of varying colors and brightnesses. Further, the light-emitting element group of the backlight unit may provide a monochromatic light, and different backlight driving signals determine different levels of the brightness of the light-emitting element group. Thus, the keyboard has a monochromatic illumination with ever-changing brightness. Furthermore, the backlight unit may have a plurality of light-emitting element groups respectively emitting lights of different colors, and the backlight driving signals determine the brightness levels of the light-emitting element groups. Varying the brightnesses of the light-emitting element groups can vary the resultant color of the mixed lights. The above-mentioned keying signal may be a key code generated by the contact of the key and a circuit board, or a character code corresponding to the key code, wherein the character code is selected from an information array. The key code and the corresponding character code all correspond to a specified key and can be used to read a backlight driving signal corresponding to the specified key from the driving signal table.

Figure 4:
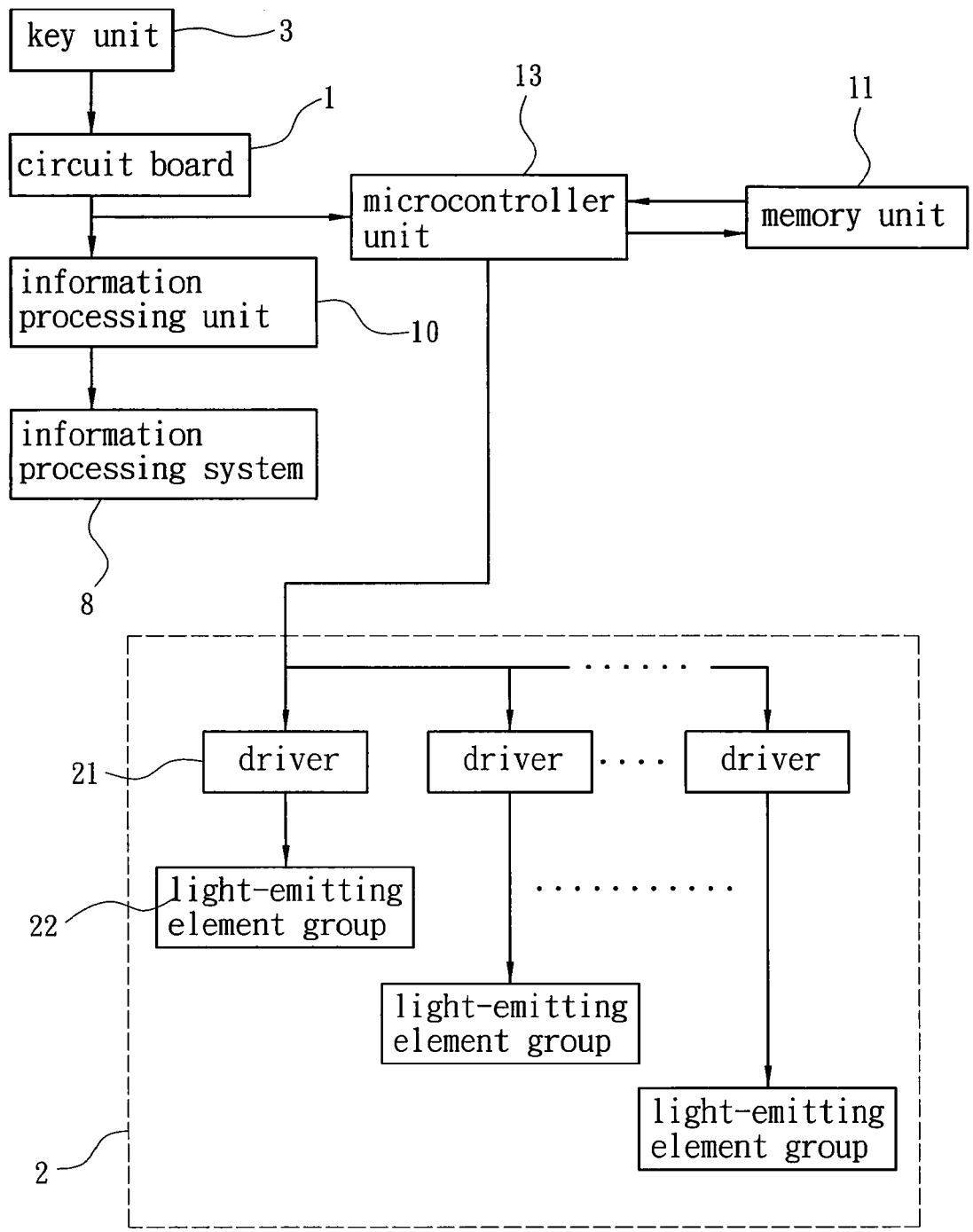
FIG. 4 is a block diagram schematically showing a first circuit architecture of a self-luminous keyboard according to the present invention.

Refer to FIG. 3 for a self-luminous keyboard for realizing the control method of the present invention, and refer to FIG. 4 for the circuit block of the self-luminous keyboard. The self-luminous keyboard for realizing the abovementioned control method comprises a casing 9, a circuit board 1 arranged inside the casing 9, a key unit 3 pressed by a user to trigger the circuit board 1 to generate a keying signal, and a backlight unit 2 arranged below the key unit 3. The key unit 3 has a plurality of keys, and the circuit board 1 has a plurality of signal contact points corresponding to the keys. Pressing a key will trigger the corresponding signal contact point to generate a corresponding key code. An information processing unit 10 of the circuit board 1 determines a character code corresponding to the key code and sends out the character code to an information processing system 8 (shown in FIG. 4 and FIG. 5) via a flat cable 12. The information processing system 8 may be a computer. The backlight unit 2 contains a plurality of light-emitting element groups 22 and a light-guide plate 24, wherein the light-emitting element groups 22 are classified by the colors of lights emitted therefrom. For example, the backlight unit 2 may have a blue light-emitting element group 22, a red light-emitting element group 22 and a green light-emitting element group 22. However, the backlight unit 2 is not limited to only have the abovementioned blue, red and green light-emitting element groups 22 but may further have light-emitting element groups 22 of other colors. The backlight unit 2 further contains drivers 21 (shown in FIG. 4 and FIG. 5) used to respectively drive the light-emitting element groups 22. As the light-guide plate 24 is not an element used to process electric signals, it is not shown in FIG. 4 and FIG. 5 diagrams showing the circuit blocks. The self-luminous keyboard further comprises a memory unit 11 and a microcontroller unit 13. The memory unit 11 stores a driving signal table having a plurality of different backlight driving signals. The backlight driving signals determine the brightness levels of the light-emitting elements 22. The relationship of the keying signals and the backlight driving signals is predetermined and written in the memory unit 11. The microcontroller unit 13 is electrically connected to the circuit board 1 to detect the keying signal, reads a backlight driving signal corresponding to the keying signal from the driving signal table, and outputs the backlight driving signal to the backlight unit 2 to determine the brightnesses of the light-emitting element groups 22. Via the technical characteristics described above, the backlight unit 2 will vary the brightnesses of the light-emitting element groups 22 according to the keys pressed by the user. When the light-emitting element groups 22 provide lights of different colors, the resultant color of the mixed lights will vary with the variation of the colors of lights respectively emitted by the light-emitting element groups 22. In other words, continuously pressing different keys will trigger different keying signals and result in ever-changing resultant colors of mixed lights.

Figure 5:
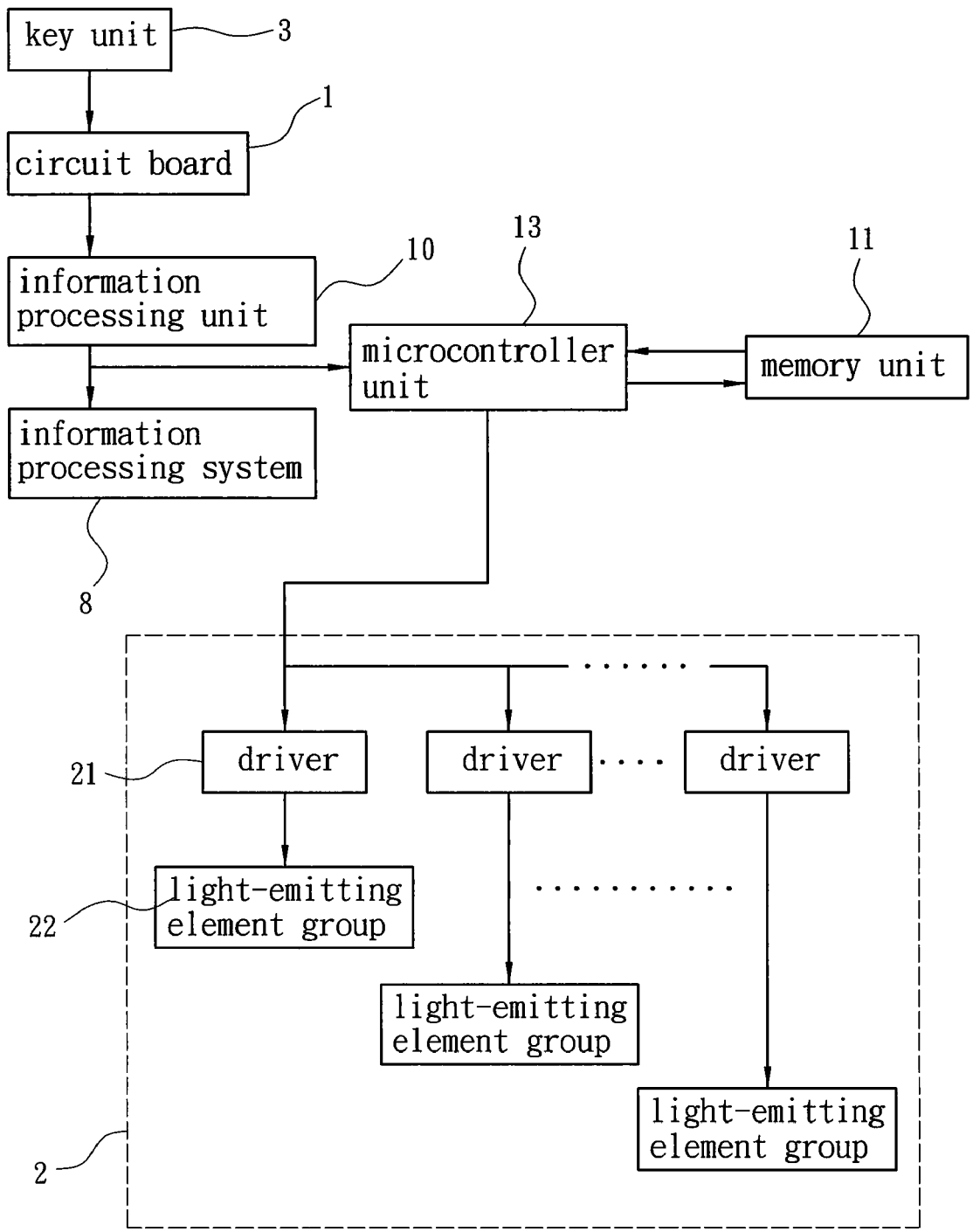
FIG. 5 is a block diagram schematically showing a second circuit architecture of a self-luminous keyboard according to the present invention.

The keying signal, which is used to read out a backlight driving signal from the driving signal table, may be a key code or a corresponding character code selected from an information array. As shown in FIG. 4, the microcontroller unit 13 detects and grasps a key code directly from the circuit board 1 and selects a backlight driving signal, which is to be output to the backlight unit 2, from the driving signal table according to the key code. Refer to FIG. 5 for another circuit architecture of the self-luminous keyboard for realizing the control method of the present invention. In FIG. 5, the microcontroller unit 13 is connected to the information processing unit 10. The information processing unit 10 receives the key code from the circuit board 1 and converts the key code into a corresponding character code. The microcontroller unit 13 grasps the character code and selects the backlight driving signal, which is to be output to the backlight unit 2, from the driving signal table according to the character code. Both the circuit architectures shown in FIG. 4 and FIG. 5 can apply to physical keyboards and realize the control method of the present invention.

The driving signal table stored in the memory unit 11 contains a plurality of different backlight driving signals. The backlight driving signal is a digital signal containing the information of the brightnesses of all the light-emitting element groups 22 and able to drive several light-emitting element groups 22 to emit light simultaneously. If there are three different light-emitting element groups 22 (red, green, and blue), the driving signal table may be exemplified by the following table.

TABLE 1 an exemplification of the driving signal table

|  | R0 | R1 | R2 | ... | R7 |
| --- | --- | --- | --- | --- | --- |
| C00 | $R_1G_1B_1$ | $R_2G_2B_2$ | $R_3G_2B_3$ | ... | $R_8G_8B_8$ |
| C01 | $R_9G_9B_9$ | $R_{10}G_{10}B_{10}$ | $R_{11}G_{11}B_{11}$ | ... | $R_{16}G_{16}B_{16}$ |
| C02 | $R_{17}G_{17}B_{17}$ | $R_{18}G_{18}B_{18}$ | $R_{19}G_{19}B_{19}$ | ... | $R_{24}G_{24}B_{24}$ |
| . | . | . | . |  | . |
| . | . | . | . |  | . |
| . | . | . | . |  | . |
| C17 | $R_WG_WB_W$ | $R_XG_XB_X$ | $R_YG_YB_Y$ | ... | $R_ZG_ZB_Z$ |

Table. 1 is only an exemplification of the driving signal table. In practical applications, the driving signal table should be adjusted according to the quantity of the light-emitting element groups 22 of the backlight unit 2 and the quantity of the keys of the key unit 3. A backlight driving signal comprises three parts: $R_n$, $G_n$, and $B_n$, wherein R, Q and B are respectively the brightness messages for the red, green and blue light-emitting element groups 22, and n is the serial number. The microcontroller unit 13 respectively assigns $R_n$, $G_n$, and $B_n$ to the corresponding drivers 21. The drivers 21 will drive the corresponding light-emitting element groups 22 to emit lights of different brightnesses according to the brightness messages R, G, and B of different serial numbers. Therefore, the backlight driving signal $R_1G_1B_1$ and the backlight driving signal $R_2G_2B_2$ will respectively drive the red, green and blue light-emitting element groups 22 to emit lights of different brightnesses. The lights of the red, green and blue light-emitting element groups 22 will mix to present different colors of lights. Thus, different backlight driving signals will drive the backlight unit 2 to present lights of different colors. Alternatively, the backlight unit 2 may only provide a single-color light, and different backlight driving signals will vary the brightness of the emitted light, as described in the above-mentioned control method of the present invention. As mentioned above, Table. 1 is only an exemplification of the driving signal table. In practical applications, the driving signal table should be adjusted according to the quantity of the light-emitting element groups 22 and the quantity of the keys. Besides, the form of the driving signal table may also vary because of the encoding format of the key code or the microcontroller unit 13. For example, the brightness information for the red, green and blue light-emitting element groups 22 are respectively stored in three tables. According to the relationship between the keying signals and the three tables, corresponding signals are read out from the three tables.

In the technical characteristics described above, pressing the keys can drive the backlight unit 2 to emit lights of corresponding colors. When the user does not press the key unit 3 (i.e. the circuit board 1 does not provide any keying signal), the microcontroller unit 13 may further provide the backlight unit 2 with a preset standby backlight driving signal that determines the brightnesses of a plurality of light-emitting element groups 22, whereby the keyboard has standby colored lights. Thus, the self-luminous keyboard has preset standby colored lights normally when the key unit 3 is not being pressed. Furthermore, the user can use the information processing system 8 and software to write data into the driving signal table inside the memory unit 11, whereby the user can change the backlight driving signals arbitrarily and determine the color of the light corresponding to one key.

Figure 6:
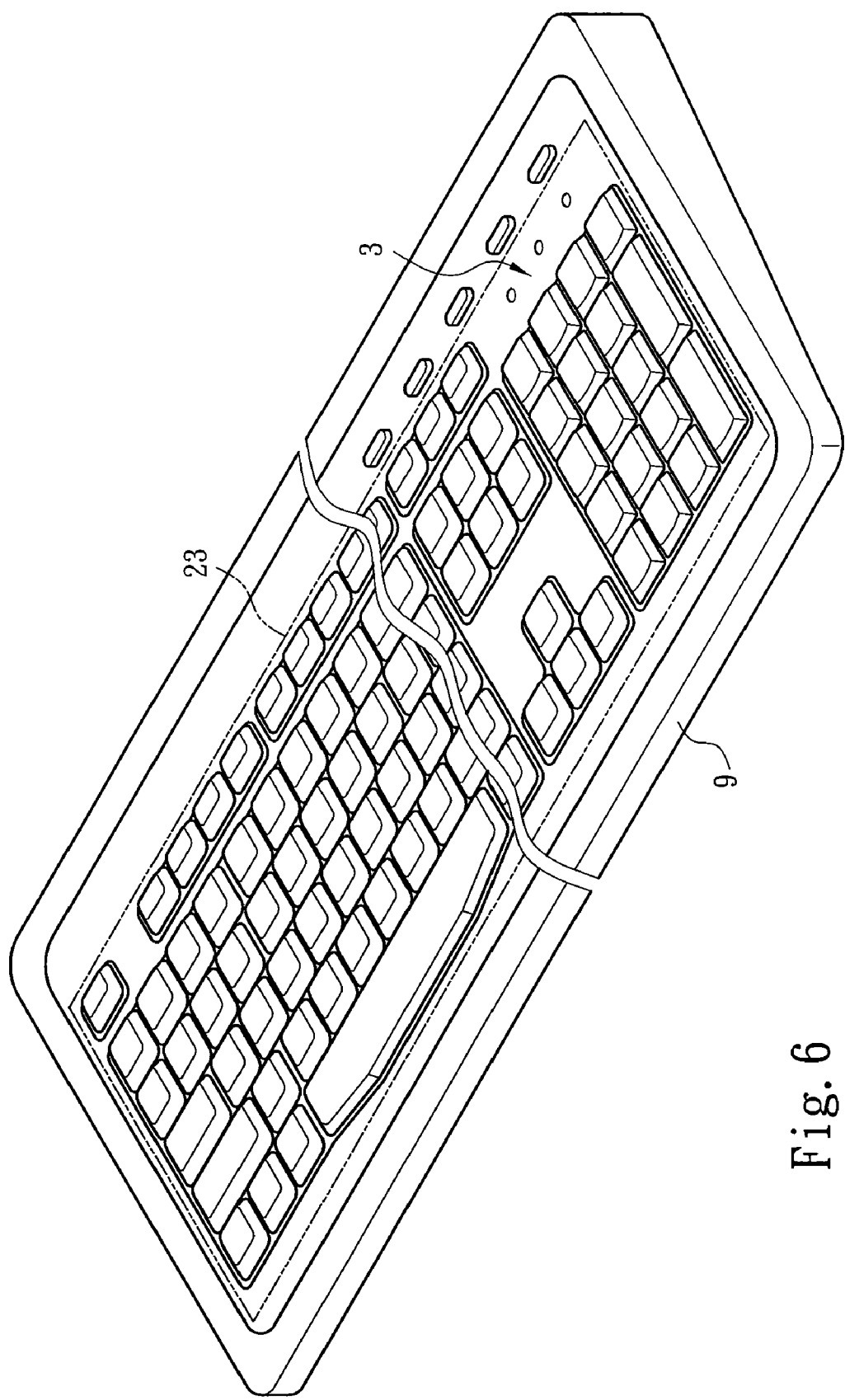
FIG. 6 is a diagram schematically showing a first embodiment of a self-luminous keyboard according to the present invention.

Refer to FIG. 6 for one embodiment of a self-luminous keyboard according to the present invention. In this embodiment, the light-emitting side of the backlight unit 2 is defined to be a single light-emitting area 23 covering the entire key unit 3. Thus, the same color of light is emitted below the key unit 3. The color of the light emitted by the backlight unit 2 is determined by the key pressed by the user and the backlight driving signal corresponding to the key.

Figure 7:
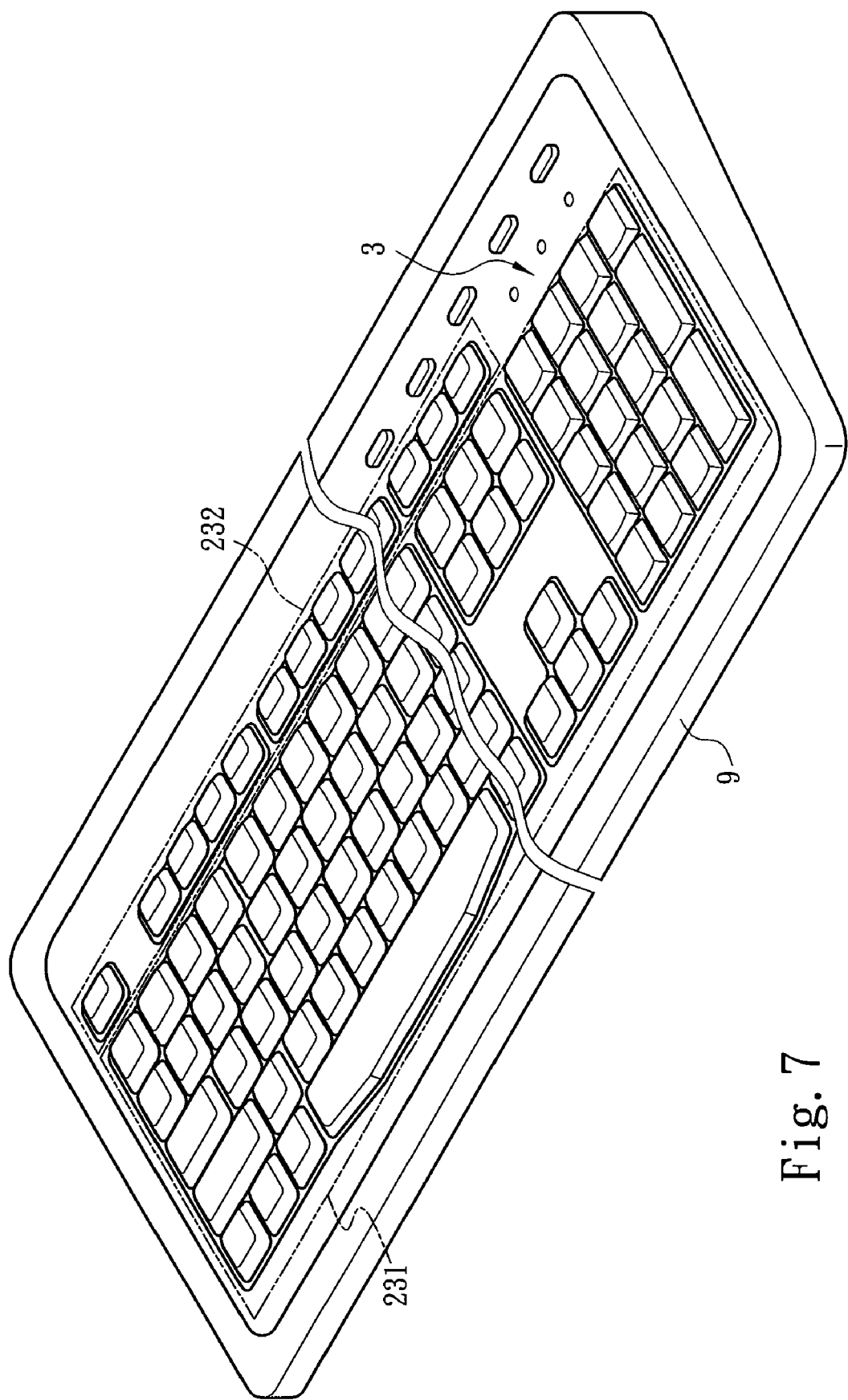
FIG. 7 is a diagram schematically showing a second embodiment of a self-luminous keyboard according to the present invention.

Refer to FIG. 7 for another embodiment of a self-luminous keyboard according to the present invention. In this embodiment, the light-emitting side of the backlight unit 2 is defined to have a first light-emitting area 231 and a second light-emitting area 232 respectively covering different keys without overlap. The backlight driving signal will drive the light-emitting element groups 22 of the first light-emitting area 231 to vary the brightness thereof. The microcontroller unit 13 provides a fixed driving signal to drive the light-emitting element groups 22 of the second light-emitting area 232 to emit a light of a preset color. Thus, the user can easily distinguish the keys having lights with the colors varying corresponding to the first light-emitting area 231 and having a light of fixed color from the keys corresponding to the second light-emitting area 232. When some functional keys need to be marked with a specified colored light, the second light-emitting area 232 may be defined to cover these functional keys. Thus, these functional keys can be easily distinguished from other keys.

Figure 2:
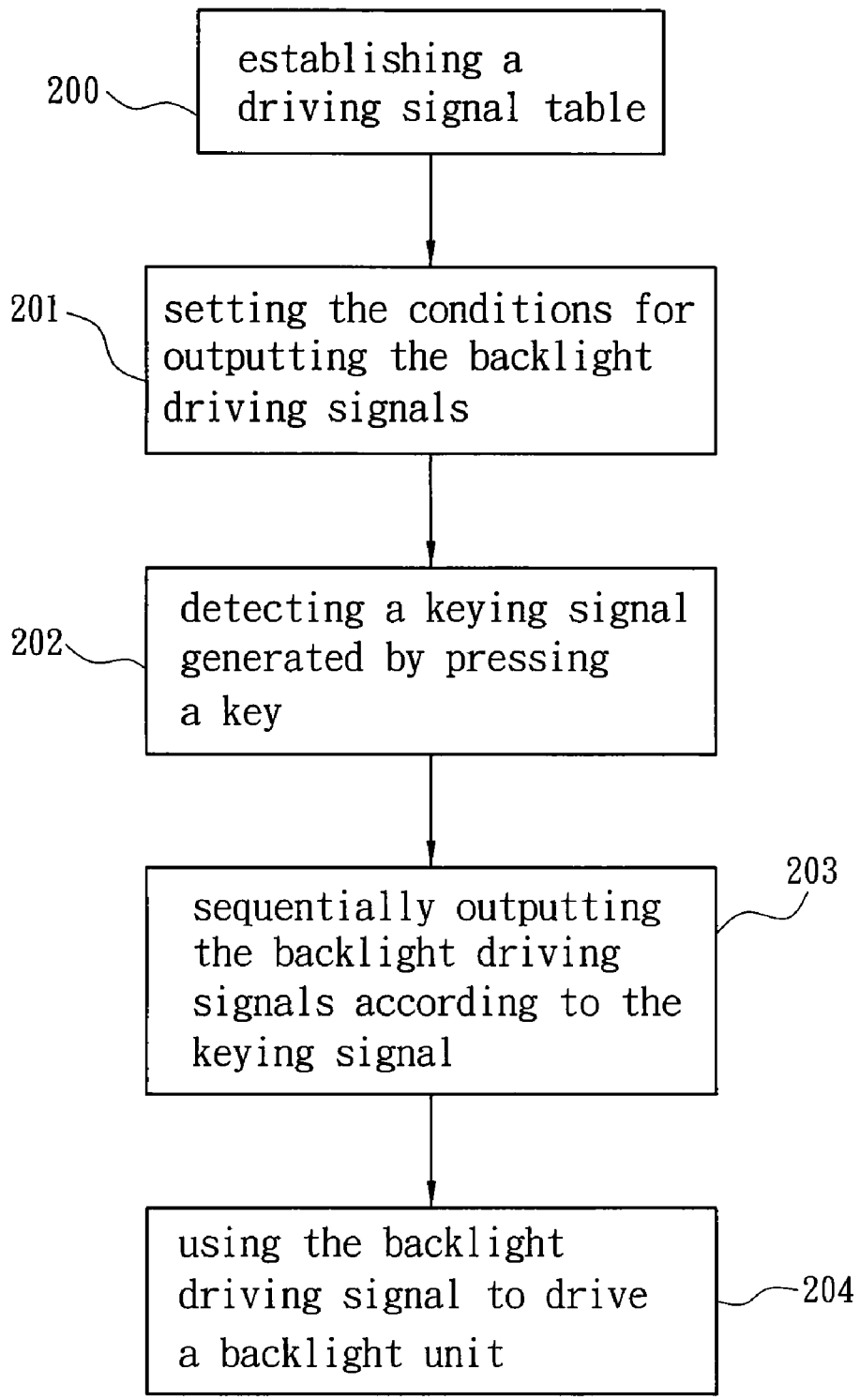
FIG. 2 is a flowchart of a second embodiment of the control method according to the present invention.

Based on the same technical thought, the present invention further proposes a second embodiment of the control method. Refer to FIG. 2 for the second embodiment of the control method according to the present invention. The second embodiment of the control method comprises steps: establishing a driving signal table containing a plurality of backlight driving signals (Step 200 in FIG. 2); setting a condition for outputting a backlight driving signal (Step 201 in FIG. 2); detecting a keying signal generated by pressing a key (Step 202 in FIG. 2); sequentially outputting the backlight driving signals according to the keying signal (Step 203 in FIG. 2); and using the backlight driving signals to drive the backlight unit (Step 204 in FIG. 2). In Step 201, detecting the generation of the keying signal is set to be the condition to output a backlight driving signal. Then, in Step 202 and Step 203, a plurality of backlight driving signals is sequentially output when the keyboard continuously generates keying signals. Thus, the backlight unit 2 is successively driven by different backlight driving signals to generate lights of varying colors in the keyboard.

The keyboard structure shown in FIG. 3 and the circuit architectures shown in FIG. 4 and FIG. 5 can also realize the second embodiment of the control method of the present invention. Similarly, the memory unit 11 stores a plurality of backlight driving signals. The microcontroller unit 13 determines whether a condition to output the backlight driving signal is satisfied via detecting the keying signal. Then, the microcontroller unit 13 sequentially reads out the backlight driving signals from the memory unit 11 to drive a plurality of light-emitting element groups 22 of the backlight unit 2. As shown in FIG. 4 and FIG. 5, the microcontroller unit 13 detects the generation of the keying signal from the circuit board 1 or the information processing unit 12. In other words, the keying signal may be a key code or a character code corresponding to the key code. The microcontroller unit 13 can sequentially read and output the backlight driving signals via a simple operational circuit or firmware, which belongs to the conventional technology and will not repeat herein.

In conclusion, the two embodiments of the control method and the circuit architectures for realizing the control method disclosed hereinbefore can provide varying colored backlights for a keyboard. Further, the present invention allows the user to define the driving signal table by himself to make the light-emitting element groups 22 of the backlight unit 2 operate in the light variation mode the user wants. Each light-emitting element group 22 is formed of a plurality of light-emitting diodes (LED). The lights emitted by the light-emitting element groups 22 have at least two colors selected from the group consisting of red, green, blue and white, and the lights of different colors may mix to result in a light having another color. As the first embodiment and the second embodiment of the control method are derived from the same technical thought, the variations of the control method will apply to the two embodiments.

The embodiments described above are only to exemplify the present invention but not to limit the scope of the present invention. Any equivalent modification or variation according to the spirit of the present invention is to be also included within the scope of the present invention, which is based on the claims stated below.

What is claimed is:

1. A control method for generating varying colored lights in a keyboard, which includes a plurality of keys pressed by a user to generate different keying signals, a circuit board corresponding to the plurality of keys to output the keying signals to an information processing system, a microcontroller unit electrically connected to said circuit board to detect said keying signals, and a backlight unit having at least one light-emitting element group, comprising steps:
   a. establishing a driving signal table containing a plurality of backlight driving signals used to control brightness of light emitted by said at least one light-emitting element group;
   b. setting conditions for outputting said backlight driving signals respectively, wherein each said backlight driving signal is corresponding to at least one said keying signal, and wherein the microcontroller unit receiving said at least one keying signal from the circuit board is set to be a condition for outputting one said backlight driving signal;
   c. detecting said keying signals generated by pressing said keys, and sending said keying signals by the circuit board to the information processing system and the microcontroller unit simultaneously; and
   d. outputting one said backlight driving signal corresponding to said at least one keying signal by the microcontroller unit to drive said light-emitting element group;
   wherein one said keying signal is a key code generated by pressing one said key to contact a circuit board, and said key code corresponds to a character code in an information array.

2. The control method for generating varying colored lights in a keyboard according to claim 1, wherein said light-emitting element group provides a monochromatic light, and one said backlight driving signal determines brightness of light emitted by said light-emitting element group.

3. The control method for generating varying colored lights in a keyboard according to claim 1, wherein said backlight unit has a plurality of said light-emitting element groups providing lights of different colors, and one said backlight driving signal determines brightness of one of said light-emitting element groups.

4. The control method for generating varying colored lights in a keyboard according to claim 1, wherein a user renews said driving signal table via writing a new backlight driving signal into said driving signal table.

5. The control method for generating varying colored lights in a keyboard according to claim 1, wherein detecting generation of said keying signals is set to be a condition for outputting one said backlight driving signal.

6. The control method for generating varying colored lights in a keyboard according to claim 5, wherein said keys are divided into a plurality of key groups; said keying signals of said keys of an identical said key group are corresponding to an identical said backlight driving signal.

7. The control method for generating varying colored lights in a keyboard according to claim 1, wherein detecting generation of one said keying signals is set to be a condition for outputting one said backlight driving signal.

8. The control method for generating varying colored lights in a keyboard according to claim 1, wherein said keyboard further includes a memory unit storing said driving signal table.

9. The control method for generating varying colored lights in a keyboard according to claim 8, wherein a light-emitting side of said backlight unit is defined to be a single light-emitting area covering all said keys.

10. The control method for generating varying colored lights in a keyboard according to claim 8, wherein said light-emitting side of said backlight unit is defined to have a first light-emitting area and a second light-emitting area respectively covering said keys without overlap; one said backlight driving signal drives said light-emitting element group of said first light-emitting area to vary brightness thereof.

11. A control method for generating varying colored lights in a keyboard, which includes a plurality of keys pressed by a user to generate different keying signals, a circuit board corresponding to the plurality of keys to output the keying signals to an information processing system, a microcontroller unit electrically connected to said circuit board to detect said keying signals, a backlight unit having at least one light-emitting element group, and a memory unit, comprising steps:

a. establishing a driving signal table containing a plurality of backlight driving signals used to control brightness of light emitted by said at least one light-emitting element group;

b. setting conditions for outputting said backlight driving signals respectively, wherein the microcontroller unit receiving at least one said keying signal from the circuit board is set to be a condition for outputting one said backlight driving signal;

c. detecting said keying signals generated by pressing said keys, and sending said keying signals by the circuit board to the information processing system and the microcontroller unit simultaneously; and d. sequentially outputting said backlight driving signals according to said at least one keying signal by the microcontroller unit to drive said light-emitting element group;

wherein one said keying signal is a key code generated by pressing one said key to contact a circuit board, and said key code is corresponding to a character code in an information array.

12. The control method for generating varying colored lights in a keyboard according to claim 11, wherein said light-emitting element group provides a monochromatic light, and different said backlight driving signals respectively determine different brightness levels of light emitted by said light-emitting element group.

13. The control method for generating varying colored lights in a keyboard according to claim 11, wherein said backlight unit has a plurality of said light-emitting element groups providing lights of different colors, and one said backlight driving signal determines brightness of one of said light-emitting element groups.

14. The control method for generating varying colored lights in a keyboard according to claim 11, wherein said memory unit stores said driving signal table; said microcontroller unit is electrically connected to a circuit board to detect said keying signals.

15. The control method for generating varying colored lights in a keyboard according to claim 14, wherein a light-emitting side of said backlight unit is defined to be a single light-emitting area covering all said keys.

16. The control method for generating varying colored lights in a keyboard according to claim 14, wherein said light-emitting side of said backlight unit is defined to have a first light-emitting area and a second light-emitting area respectively covering said keys without overlap; one said backlight driving signal drives said light-emitting element group of said first light-emitting area to vary brightness thereof.

\* \* \* \* \*